US012188259B2

(12) United States Patent
Pierce

(10) Patent No.: US 12,188,259 B2
(45) Date of Patent: Jan. 7, 2025

(54) LOCK, METHODS OF USING AND MAKING, PRODUCTS, AND NECESSARY INTERMEDIATES

(71) Applicant: Adam Pierce, Seaside, CA (US)

(72) Inventor: Adam Pierce, Seaside, CA (US)

(73) Assignee: Adam Pierce, Seaside, CA (US)

( * ) Notice: Subject to any disclaimer, the term of this patent is extended or adjusted under 35 U.S.C. 154(b) by 427 days.

(21) Appl. No.: 17/106,903

(22) Filed: Nov. 30, 2020

(65) Prior Publication Data

US 2021/0230902 A1 Jul. 29, 2021

Related U.S. Application Data

(60) Provisional application No. 62/966,138, filed on Jan. 27, 2020.

(51) Int. Cl.
*E05B 27/02* (2006.01)
*E05B 27/00* (2006.01)
*E05B 27/08* (2006.01)

(52) U.S. Cl.
CPC .......... *E05B 27/02* (2013.01); *E05B 27/0007* (2013.01); *E05B 27/006* (2013.01); *E05B 27/086* (2013.01)

(58) Field of Classification Search
CPC ............. E05B 27/0007; E05B 27/0032; E05B 27/0078; E05B 27/0082; E05B 27/02; E05B 27/08; E05B 27/083; E05B 27/006; E05B 27/086
See application file for complete search history.

(56) References Cited

U.S. PATENT DOCUMENTS 3,722,240 A * 3/1973 Spain .................. E05B 27/0082 70/494
3,987,654 A * 10/1976 Iaccino ............... E05B 27/0082 70/494
4,377,940 A * 3/1983 Hucknall ............ E05B 27/0067 70/378
4,723,427 A * 2/1988 Oliver ................. E05B 27/0082 70/494
4,732,022 A * 3/1988 Oliver ................. E05B 27/0039 70/494
6,477,875 B2 * 11/2002 Field ................... E05B 27/0039 70/494
7,775,074 B1 * 8/2010 Tobias ................ E05B 27/0017 70/494
7,797,973 B2 * 9/2010 Field ................... E05B 27/0039 70/494
8,720,241 B1 * 5/2014 Widen ................ E05B 27/0082 70/494
9,416,561 B2 * 8/2016 Field ................... E05B 27/0017

OTHER PUBLICATIONS

Lockpickinglawyer "[527] Pickproof your Kwikset For Less Than $1" YouTube video of 8 minutes and 35 seconds. Sep. 9, 2017. https://www.youtube.com/watch?v=7JlgKCUqzA0.

* cited by examiner

*Primary Examiner* — Christopher J Boswell
(74) *Attorney, Agent, or Firm* — Peter K. Trzyna

(57) ABSTRACT

Articles of manufacture, machines, processes for using the articles and machines, processes for making the articles and machines, and products produced by the process of making, along with necessary intermediates, directed to a lock and key system.

20 Claims, 7 Drawing Sheets

LOCK, METHODS OF USING AND MAKING, PRODUCTS, AND NECESSARY INTERMEDIATES

I. PRIORITY STATEMENT

The present patent application claims benefit from, and incorporates by reference from as if fully restated herein, Ser. No. 62/966,138, filed Jan. 27, 2020.

II. BACKGROUND

Lock and key devices date back to antiquity and come in many variations. A lock is a mechanical or electronic fastening device that is released by a physical object (such as a key, card, token, coin, etc.), by supplying secret information (such as a number or letter permutation or password or code), or by a combination thereof. A key is a device that is used to operate a lock (such as to lock or unlock the lock). A key typically, but not always, is a small piece of metal having two parts: a bit or blade, which slides into a keyway of the lock and distinguishes between different keys; and the bow, which protrudes so that torque can be applied by a user. In its simplest implementation, a key operates one lock or set of locks that are keyed alike, a lock/key system where each similarly keyed lock requires the same, unique key. The key serves as a security token for access to that which is locked; only the person(s) having the correct key can open the lock and gain access. In more complex mechanical lock/key systems, two different keys, one of which is known as the master key, serve to open the lock. Still a need exists for greater variety and security.

III. SUMMARY

The disclosure below uses different embodiments to teach the broader principles with respect to articles of manufacture and apparatuses, processes for using them and processes for making them, and products produced by the process of making, along with necessary intermediates. This Summary is provided to introduce the idea herein that a selection of concepts is presented in a simplified form as further described below. This Summary is not intended to identify key features or essential features of subject matter, nor is this Summary intended to be used to limit the scope of claimed subject matter. Additional aspects, features, and/or advantages of examples will be indicated in part in the description which follows and, in part, will be apparent from the description, or may be learned by practice of the disclosure.

With this in mind, consider a key inserted into a lock so as to set one or more passive lock elements, hereafter 'tooth' or 'teeth' into some configuration. That is, the teeth are not applying a mechanical force that drives or prevents the operation of the lock. The teeth are then moved away from the exterior surfaces of the lock and other lock components to block access to these teeth from the exterior of the lock. Accordingly, the teeth are removed from exterior access whether or not they are in the configuration that corresponds to the intended key. Only after access has been blocked to the exterior are the teeth compared against a mechanical resistor or resistors that correspond in configuration to the intended key. In typical operation, the lock opens if and only if the teeth are in the same configuration they would be placed by the intended key. If they are not in that configuration, the teeth are blocked from moving and prevent the lock from opening, such however that the teeth do not seize or freeze the lock.

IV. DRAWINGS

V. DETAILED DISCLOSURE OF MODES

Figure 1:
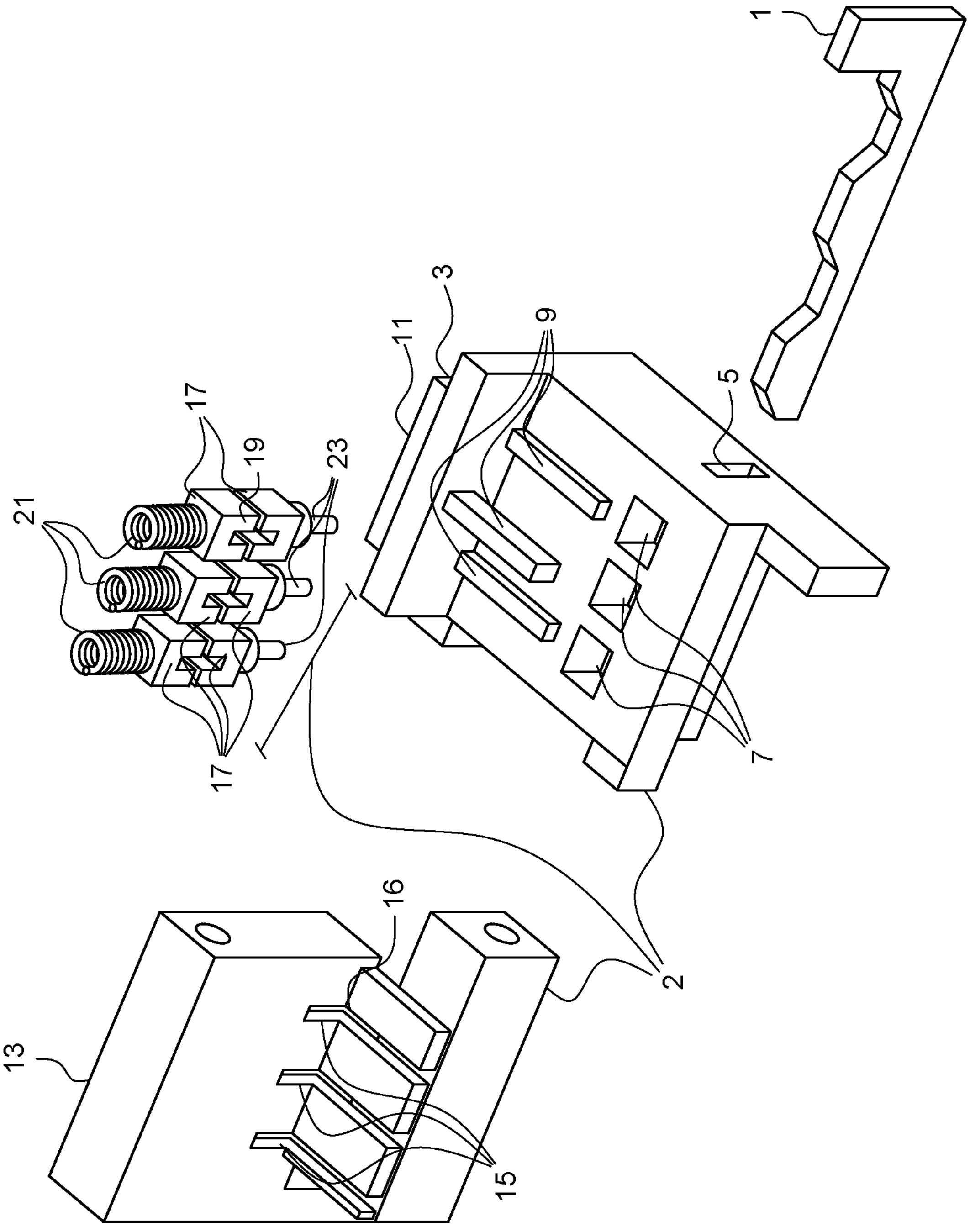
FIG. 1 illustrates an embodiment of a key and lock formation.

In the general case, concerning some but not all embodiments, there can be an input pin, e.g., one that is a cylindrical, oblong, angular, or rectangular solid made of metal or other rigid material. Once a key is inserted, the input pin (or other input-aiding mechanism such as a ball bearing) is in contact with the key and moves, such as up or down in a channel, in order to allow the key to determine a position of the input pin and other lock components such as (but not necessarily) teeth. Depending on the embodiment, all input pins may or may not be identical—e.g., where they are not the primary or intended locking mechanism.

There can be a tooth—e.g., a cylindrical, oblong, angular, or rectangular solid made of metal or other rigid material. The tooth can be oriented to be pressed against the input pin by a force from another lock component, i.e., a pushing mechanism such as a spring or other biasing mechanism. Depending on the embodiment, there can be one or more teeth. The teeth can be oriented to serve as passive lock elements which are set by the key or other mechanical input and later verified against mechanical resistors. For example, the teeth can be solid so as to not rotate around their vertical axis (ruling out a symmetrical cylinder) and typically have a channel machined into the tooth on one side (see figures). The channel may also be provided by accretion such as welding or material deposit, or provided by rails or other guards. The teeth can be arranged in avenues such that the tooth in physical contact with the input pin has the channel facing away from the input pin, and the tooth not in contact with the input pin has the machined channel facing towards the input pin.

There can be a combined avenue—e.g., a channel, groove, or compartment in which the input pins and teeth sit when the lock is in the closed or locked position. In a traditional pin-tumbler lock this would involve channels in the core (compare with the moveable frame discussed below) aligned with channels in a pin receiver or lock body (compare with the fixed frame discussed below). However, as elaborated below, in some but not all embodiments, there can be a fin design in which the combined avenue must not be rotationally symmetric around the "vertical" axis (i.e., the axis extending through all teeth in a given chamber) so that teeth cannot spin in place.

There can be a moveable frame—e.g., a component generally central in the lock which contains the input pins and a keyway and which moves when the lock is opened as intended for unlocking. Though not necessarily so for all applications, there can be a fin design in which the moveable frame has fins and prongs attached during manufacture or has elements to allow fins and prongs to be attached temporarily. The elements for temporary attachment can in some cases include holes or channels in a side of the frame body as well as elements on the rear or front faces of the lock such as a comb or grid of fins and prongs or gearing, channels, or holes capable of attaching a comb or grid of fins and prongs. So for example, the moveable frame can rotate during intended operation so as to rotate an actuator which operates to open a physical locking mechanism, such as a deadbolt or shackle.

There can be a keyway—e.g., an opening, channel, or groove, into which the key is inserted or against which the key is pressed during intended operation. A variation on the fin design is to use a circular keyway and a rotationally symmetric key in order to prevent brute-force twisting attacks.

There can be one or more fins—e.g., a fin being strip of metal or other rigid material placed against or machined into the outside of the moveable frame facing the interior of the fixed frame or the housing into which the fixed frame is installed. The fin(s) could be placed adjacent to the moveable frame and perpendicular to an avenue in the fixed frame. In this manner, as the moveable frame rotates, the fin(s) fit(s) into a downward-facing channel of a tooth if only one tooth in the avenue was lifted into the fixed frame so as to allow rotation to continue and the lock to fully reach the open position. If both teeth were lifted in an avenue, a fin will press against the bottom of the lower tooth and prevent further rotation, preventing the complete opening of the lock.

There can be one or more prongs—e.g., a prong being a strip of metal or other rigid material placed adjacent to or machined into the outside of the moveable frame facing the interior of the fixed frame or the housing into which the fixed frame is installed. Said prong could be placed with a gap along its length between the prong and the moveable frame and perpendicular to the avenue in the fixed frame. As the moveable frame moves, the prong fits into the channels of said teeth if two teeth in the combined avenue were lifted into the avenue of the fixed frame. This allows rotation to continue and the lock to fully reach the open position. If only one tooth was lifted into the avenue of the fixed frame, a prong will press against the top of the tooth and prevent further rotation, preventing the complete opening of the lock.

There can be an avenue in the fixed frame—e.g., an element made of metal or other rigid material which contains the portion of the combined avenues not contained by the moveable frame and into which teeth are pushed by the input pins during normal operation. Typically, but not necessarily, the fixed frame extends around the moveable frame, and the moveable frame rotates in place in a space inside the fixed frame during normal operation. In some fin designs, if fins and prongs are attached to the side of the moveable frame, the fixed frame has channels or gaps to allow the fins and prongs to extend from the moveable frame's exterior surface to interface with the avenue of the fixed frame and/or teeth during operation. Additionally, in some embodiments, regardless of how the fins/prongs are placed within the locking mechanism, the fixed frame can have gaps that allow the fins or prongs to press against the teeth (during a failed open) or through the teeth (during a successful open).

There can be a key—e.g., a piece of metal or other rigid material which can be inserted or applied to the lock in order to set the lock elements into a configuration that allows the lock to open.

In a nonlimiting illustration, the key is inserted into the keyway. The key is shaped such that it lifts each input pin to some height, which also lifts the teeth in that particular avenue. The key is shaped such that the height of each input pin fails to block the moveable frame from moving and places the appropriate number of teeth into the corresponding avenues of the fixed frame. The key is rotated, applying a rotational torque to the lock, causing the moveable frame to rotate. Because the appropriate number of teeth has been set in each avenue, each fin is aligned with a single tooth with a channel facing down and each fin can pass under/through the channel allowing rotation to continue. Each prong is aligned with an avenue which contains two teeth and passes through the gap between them, allowing rotation to continue until the lock opens.

In operation during attack, for example, if the attacker were to use a pick, wrench, rake, snap gun, or other tool to set some number of teeth into the avenues of the fixed frame, the attacker would be able to rotate the moveable frame partially using a tension wrench, screwdriver, or other tool. However, the partial rotation of the moveable frame would block access to fins, prongs, teeth, and any lock element at all except the moveable frame exterior, keyway, and input pins (which can be available to attackers). As rotation continues, any fins which are aligned with teeth where two teeth have been lifted into the avenue of the fixed frame will be blocked by the bottom (non-channel-cut) portion of the lower tooth. Any prongs which are aligned with single teeth will press against the top of the tooth which does not include a machined channel and block further rotation. The lock will not open if any avenues contain the incorrect number of teeth for the fin or prong element that is lined up with that avenue. To open the lock, the attacker must use destructive methods or return the lock to the open position and try again. Because the attacker does not know which teeth blocked rotation and does not know which avenues in the moveable frame correspond to the teeth that blocked rotation, the attacker does not know which teeth need to be moved or reoriented and can only try different combinations of input pin heights corresponding to different combinations of number of teeth in each avenue of the fixed frame. As long as there are many possible combinations of input pin heights (achievable simply by adding more avenues with corresponding input pins and teeth) the amount of time to execute this kind of attack can be made higher than the time available to the attacker. For example, assuming that it takes 1 second to set every pin and attempt to open the lock, it takes only 32 pins for this kind of attack to require 100 years of continuous attempts to guarantee that the lock opens.

Consider now a pictorial teaching of certain embodiments herein. FIG. 1 provides an illustration of a fin lock embodiment, suitable for the interior of a lockbox, safe, etc. Key 1 can be made of a rigid material. The key 1, if so desired, may be a type in common use today for cylindrical pin-and-tumblers locks, or key 1 may instead have fewer differs and/or may lack profile variations normally present in order to interface with warded or paracentric keyways. A frame 3 is structured to interfaces with other components and has a range of motion within the lock.

In frame 3 there is a keyway 5 which allows the key 1 to extend into the frame 3 sufficiently to interface with other components. Avenues 7 in frame 3 include openings to the keyway 5. Mechanical resistors 9, in this case bars at differing heights, serve to block the operation of the lock unless a gap is present in the corresponding tooth or teeth 17 at the appropriate height. In some embodiments, a deadbolt 11 is configured to interface with overlapping holes in a locking arrangement. Second frame 13 is structured to interface with other components and can be secured so as to be fixed in place rather than moveable with respect to the lockbox or other housing. Avenues 15 in second frame 13 correspond to locations of avenues 7 in frame 3.

Teeth 17 serve as mobile elements in this design, somewhat but not completely comparable in function to a pin in a tumbler or a disc in a detainer. The function of teeth 17 differs in that the teeth may be identical from avenues 15 ('pin stack' in a pin-and-tumbler design) to each other such avenue 15. The function of teeth 17 further differs in that they can have a multi-stage process of their use. The teeth 17 serve to indicate the bitting of the inserted key, and as the lock 2 operates, the teeth 17 are separated from the keyway 5 before being validated. In comparison to a mechanically resistive system, i.e., a system composed of mechanical resistors, which require that all indicated bitting positions match the resistive system 9. Because the comparison of teeth to resistors for embodiments herein happens after separation from the keyway 5, no manipulation attack based on using tools to feel how the elements of the keyway 5 interface with the rest of the lock is possible. An example of such an attack is single-pin-picking, which is a vulnerability in both pin-and-tumbler designs as well as disc detainer designs. Therefore, lock picking tools that do not work with the embodiments herein include electric pick guns, rake-style lockpicks, bump tools or bump keys, traditional lockpicks such as 'hook' or 'flag' lockpicks, and impressioning tools such as brass key blanks and files. Other tools such as shims or combs address known vulnerabilities in existing locks and have known design countermeasures. These known countermeasures can be used with my design as well to prevent shimming or combing attacks.

At least one channel 19 is located so as to be capable of interfacing with the mechanical resistor(s) 9. The teeth 17 must be capable of interfacing with the resistors 9 in some way. In this embodiment, the number of teeth 17 displaced into the fixed frame 3 serves to allow or disallow the resistor 9 to pass by positioning a channel 19 in front of the resistor 9 when the correct key 1 is inserted so as to position the teeth 17 to block the resistor 9 otherwise. Springs 21 position the teeth 17 at one end 16 of the avenue 15 in the fixed frame 3. Input pins 23 aid the key 1 in influencing the position of the teeth 17.

Figure 2:
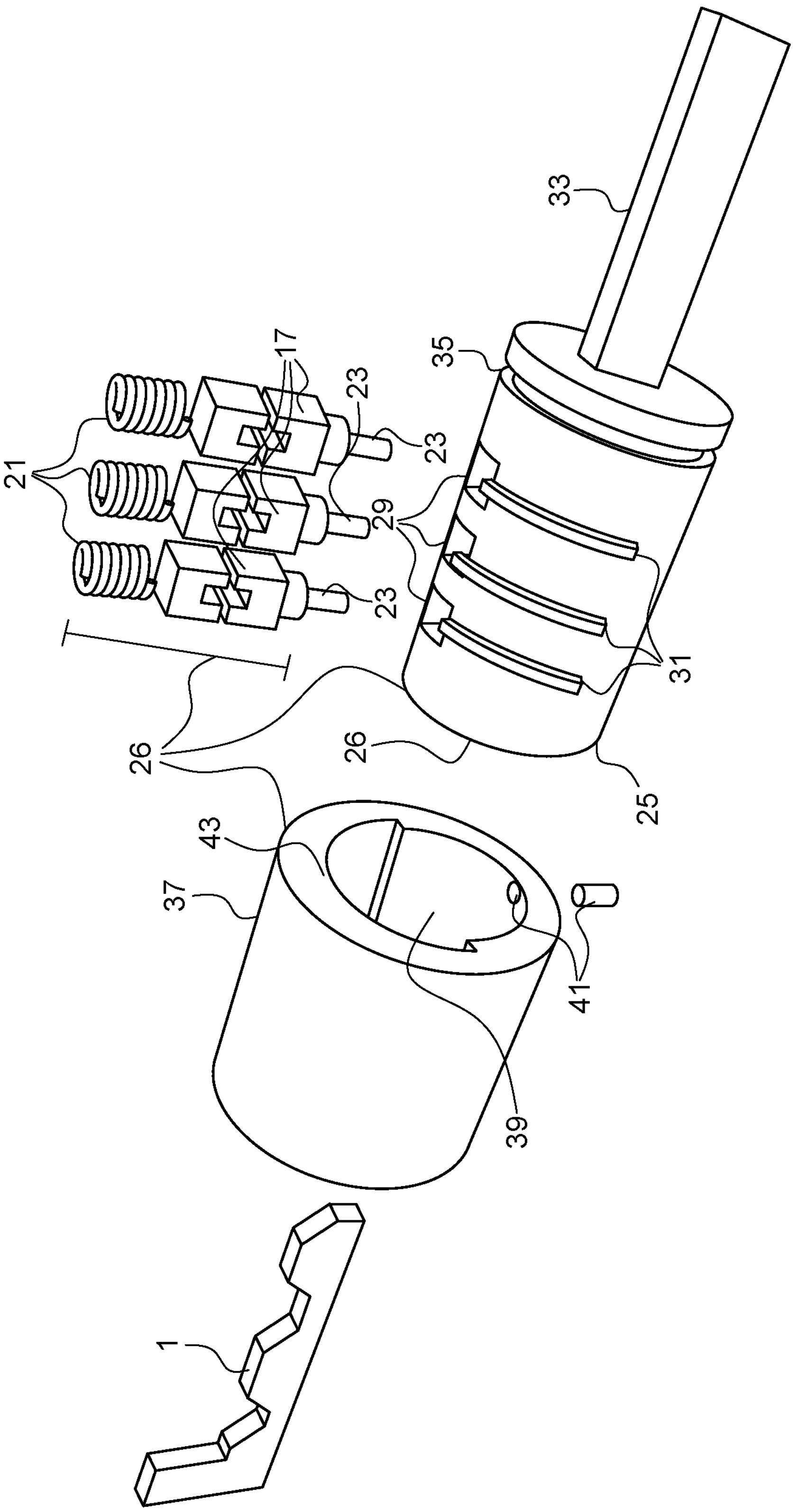
FIG. 2 illustrates another embodiment of a key and lock formation.

Illustrative of the variety of embodiments to which the principles herein can be applied, FIG. 2 provides an illustration of a cylindrical fin lock, suitable for a mortice or other housing, Key 1 can be made of a rigid material. The key 1, if so desired, may be a type in common use today for cylindrical pin-and-tumblers locks, or key 1 may instead have fewer differs and/or may lack profile variations normally present in order to interface with warded or paracentric keyways. A frame 25 is structured to interface with other components and has a range of motion within the lock 26 and relative to the mortice or other housing.

In frame 25 there is a keyway 27 which allows the key 1 to extend into the frame 25 sufficiently to interface with other components. Avenues 29 in frame 25 include openings to the keyway 27. Frame 25 includes mechanical resistors 31, in this case bars at differing heights, which serve to block the operation of the lock 26 unless a gap is present in the corresponding tooth or teeth 17 at the appropriate height. An actuator 33 is configured to interface with a deadbolt or other mechanism typical of commercially available mortice locks. Second frame 37 is structured to interface with other components and can be secured so as to be fixed in place rather than moveable with respect to the mortice or other housing.

Avenues 43 in second frame 37 correspond in position to locations of avenues 29 in frame 25. Avenues 43 must be structured so as to permit the intended operation of the lock 26, such as the resistors 31 being able to pass through or past the avenues 43 when the correct key 1 is inserted.

Other frame 37 contains a space 39 designed to encompass the first frame 25. The first frame 25 is retained within the second frame 37 by means of a hole and matching pin 41 which interfaces with a groove 35.

When frame 25 holds the second frame 37, teeth 17 are positioned in the avenues 20 (not shown in FIG. 2) and/or the avenues 43. Their function is to "record" the bitting of the inserted key 1 for later verification by comparison to resistors 31. This function prevents lockpicking because the verification system need not convey mechanical stress or force to any exterior element of the lock 26. Thus, some embodiments herein have verification structures devoid of conveying mechanical stress and/or force to any exterior element of the lock 26. In comparison, modern commercially available locks, such as pin-and-tumbler locks, apply mechanical stress to exterior-facing lock elements such as key pins.

Springs 21 are positioned in the avenues 43 and direct the teeth 17 in the direction of the frame 25. This ensures that the key 1 displaces the same number and position of teeth 17 each time the key 1 is inserted into the keyway 27. The consistent operation of the key 1 is further aided by input pins 23 which allow the key 1 to act on the teeth 17 over a short distance.

Figure 3:
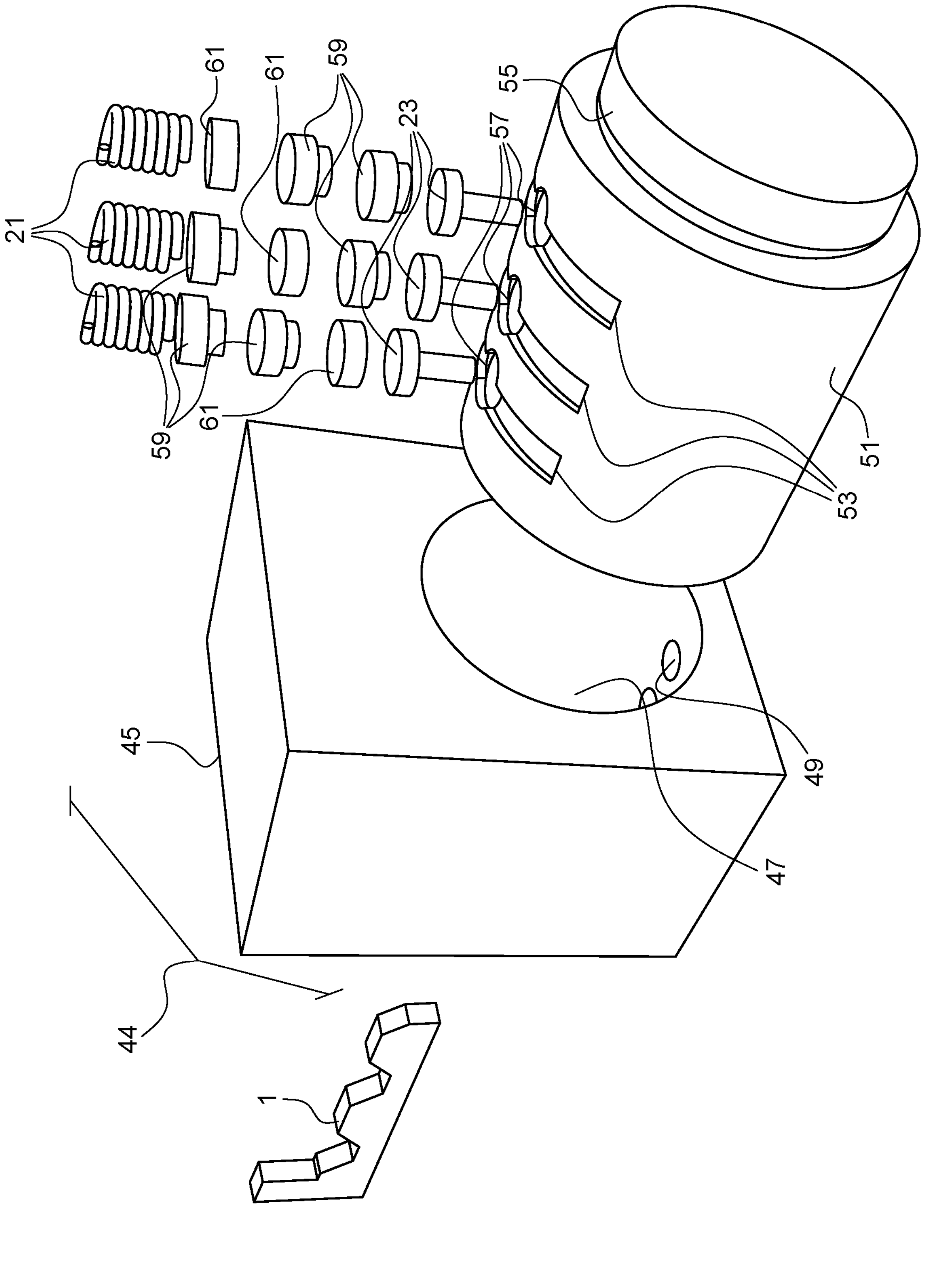
FIG. 3 illustrates another embodiment of a key and lock formation.

A further illustration of the variety of embodiments to which the principles herein can be applied, consider FIG. 3 which provides an illustration of a cylindrical groove lock embodiment, suitable for a mortice or other housing. Key 1 can be made of a rigid material. The key 1, if so desired, may be a type in common use today for cylindrical pin-and-tumblers locks, or key 1 may instead have fewer differs and/or may lack profile variations normally present in order to interface with warded or paracentric keyways.

A frame 51 is structured to interface with other components and has a range of motion within the lock 44 and relative to a mortice or other housing. Frame 51 includes avenues 57. Frame 51 further includes mechanical resistors 53, in this case grooves or channels machined into the exterior of frame 51. Second frame 45 is structured to interface with other components and can be secured so as to be fixed in place rather than moveable with respect to the mortice or other housing.

Other frame 45 contains a space 47 designed to encompass the first frame 51. First frame 51 includes a depression 55 suitable for attaching a retaining clip or other retaining mechanism in order to maintain the position of first frame 51 within the space 47 present in second frame 45.

Teeth 59 and other teeth 61 are manipulated by the key 1 with help of input pins 23. When the correct key 1 is inserted, each groove 53 will be level with the bottom of a tooth 61 which lacks an additional protrusion found on teeth 59. If at least one tooth is positioned other than as would be done by the intended key 1, a tooth 59 will be placed immediately adjacent to the groove 53. The protrusion of the tooth 59 will become ensnared in the groove 53, preventing the lock 44 from opening. Because the groove 53 extends a short distance around the surface of the frame 51, the frame 51 must rotate partially in order to bring the tooth 59 in contact with the end of the groove 53. This ensures that the input pins 23 are no longer aligned with the teeth 59 or the teeth 61. As a result, input pins 23 cannot influence the position of teeth 59 or teeth 61 in this position. This prevents the use of a tool such as a hook-style lockpick from being able to either manipulate the lock open or to feel physically which input pin 23 is associated with an incorrectly-set tooth 59 or tooth 61. As a result, such a tool cannot serve to open the lock 44 without the intended key 1.

It should be noted that master-keying can be accommodated by including multiple teeth lacking protrusions 61 in some or all of the avenues 57. While this reduces the security of the lock somewhat, the reduction in security may be offset by the inclusion of additional avenues 57, with for each avenue the associated groove(s) 53, input pins 23, teeth 59, teeth 61, and springs 23.

Figure 4:
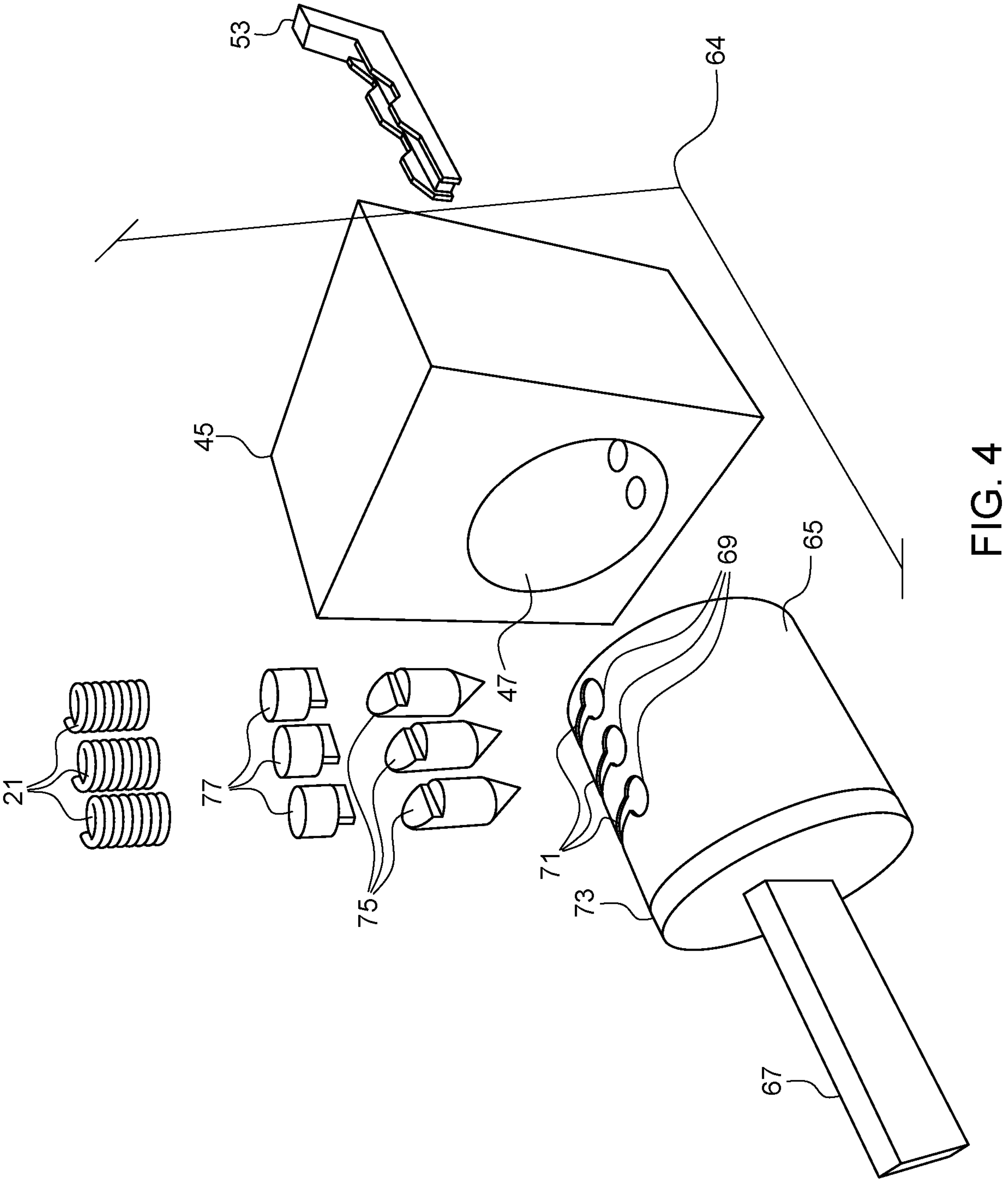
FIG. 4 illustrates yet another embodiment of a key and lock formation.

Springs 21 direct the teeth 59, teeth 61 and input pins 23 in the direction of the frame 51. This ensures that the key 1 displaces the same number and position of teeth 59, teeth 61 and input pins 23 each time the key 1 is inserted into lock 44. A further illustration of the variety of embodiments to which the principles herein can be applied, FIG. 4 provides an illustration of a groove-based lock embodiment in which the orientation, rather than position, of a lock element is verified. FIG. 4 is a lock and key suitable for a mortice or other housing. Key 63 can be made of a rigid material. The key 63 includes protrusions that are asymmetric laterally, allowing the key to interact with lock elements as it is inserted, such that a properly positioned element would experience a twisting force.

The lock 64 portion of the lock-and-key apparatus has multiple components. There is a frame 45 which can be fixed in place with regard to the mortice or other housing. There is a second frame 65 having a range of motion relative to the mortice or other housing in which the lock 64 is installed. The frame 45 has a space 47 capable of encompassing the other frame 65.

The mobile frame 65 has several features. There is a groove 73 to aid in the retention of the frame 65 within the space 47 inside the stationary frame 45. There is a deadbolt or actuator 67, capable of interfacing the locking mechanism of a mortice in common commercial use today. There are avenues 69. There are grooves 71, at least one per avenue 69 extending further along the surface of the frame 65 than the others for that avenue 69.

Situated in the avenues 69 there are input-aiding pins 75. These pins 75 extend through the avenues 69 with a surface which allows rotation of the input-aiding pin 75 by the key 63. Also situated in the avenues 69 are teeth 77 which have an offset piece of metal extending towards the input-aiding pins 75. The offset metal protrusion of the teeth 77 acts as a skate. When the key 63 is inserted into the lock and acts through the avenues 69 to rotate the input-aiding pins 75, the pins 75 in turn rotate the teeth 77 and cause the skate to align with one of the grooves 71 connected to the avenue 69 in which that particular tooth 77 is located. As the lock is rotated by the torque applied by the user to the key 63, the skate of the tooth 77 moves along the groove 71. If every tooth 77 has been oriented as if by the intended key 63, the skate will be in the longer groove 71 of the grooves 71 per that avenue 69. This allows the user to continue rotating the key 63 sufficiently for the actuator 67 to operate the mortice or other housing in which the lock 64 is installed. If instead at least one tooth 77 is otherwise oriented, the skate of that tooth 77 will become ensnared in the groove 71 prior to sufficient rotation being achieved, and the lock 64 will not open.

Finally, positioned in each avenue 69 is a spring 21 that provides a pushing force to align the input-aiding pins 75 and teeth 77 towards the mobile frame 65.

In making of the foregoing, the moveable frame 3 and fixed frame 13 can be machined out of solid blocks of metal and the avenues can be drilled out for the teeth 17 and the openings 7. The teeth 17 can be cut from a long thin piece of metal (like a rod) and then machined to have any irregular surfaces as necessary, such as the channels 19.

Figure 5:
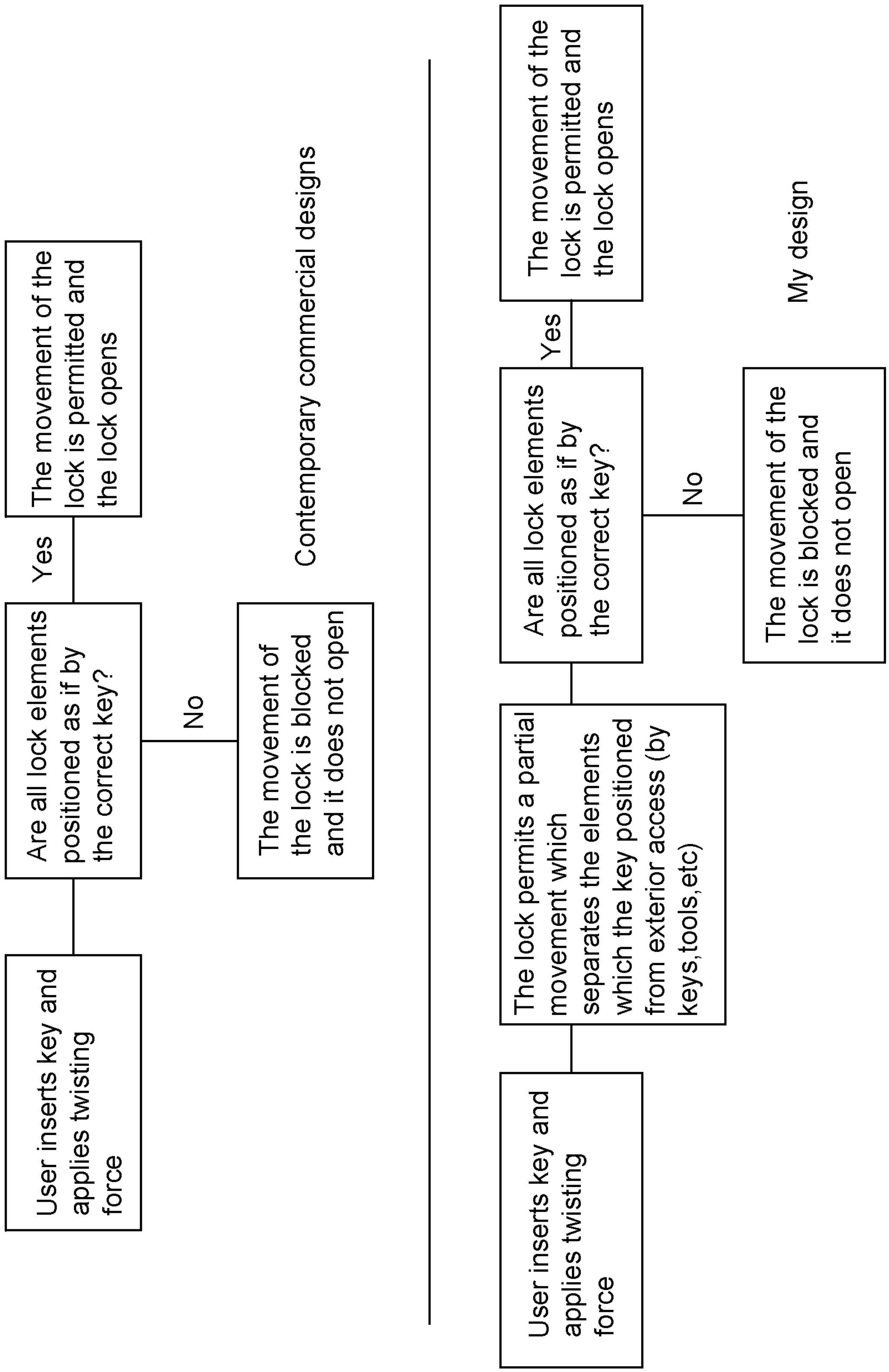
FIG. 5 illustrates an embodiment of a flowchart for such an embodiment.

In FIG. 5, the portion labeled "Contemporary Commercial Designs" differs from the portion labeled "My Design," except for the box labeled "User Inserts Key And Applies Twisting Force." This suggestive that, other than the common portion of "User Inserts Key And Applies Twisting Force," embodiments herein can in some cases be devoid of one or more of the items listed in the boxes of "Contemporary Commercial Designs."

Figure 6:
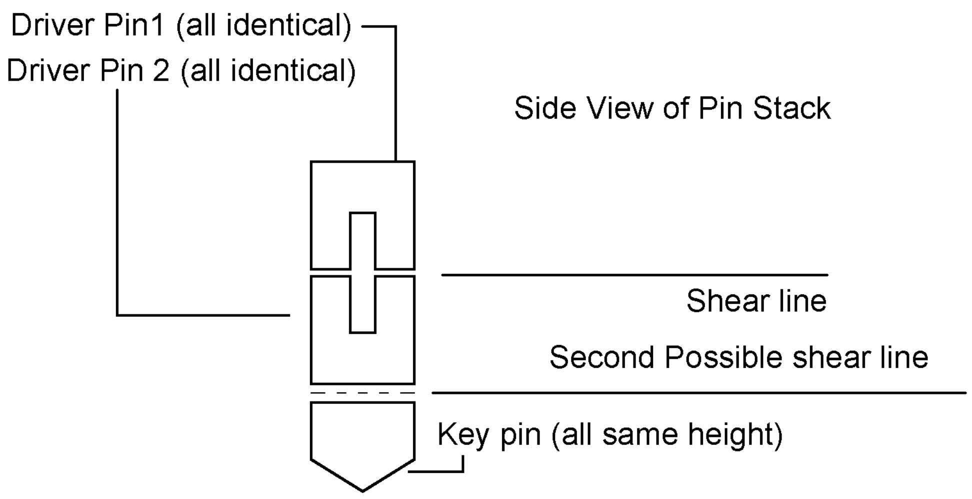
FIG. 6 illustrates another illustration of an embodiment.
Figure 7:
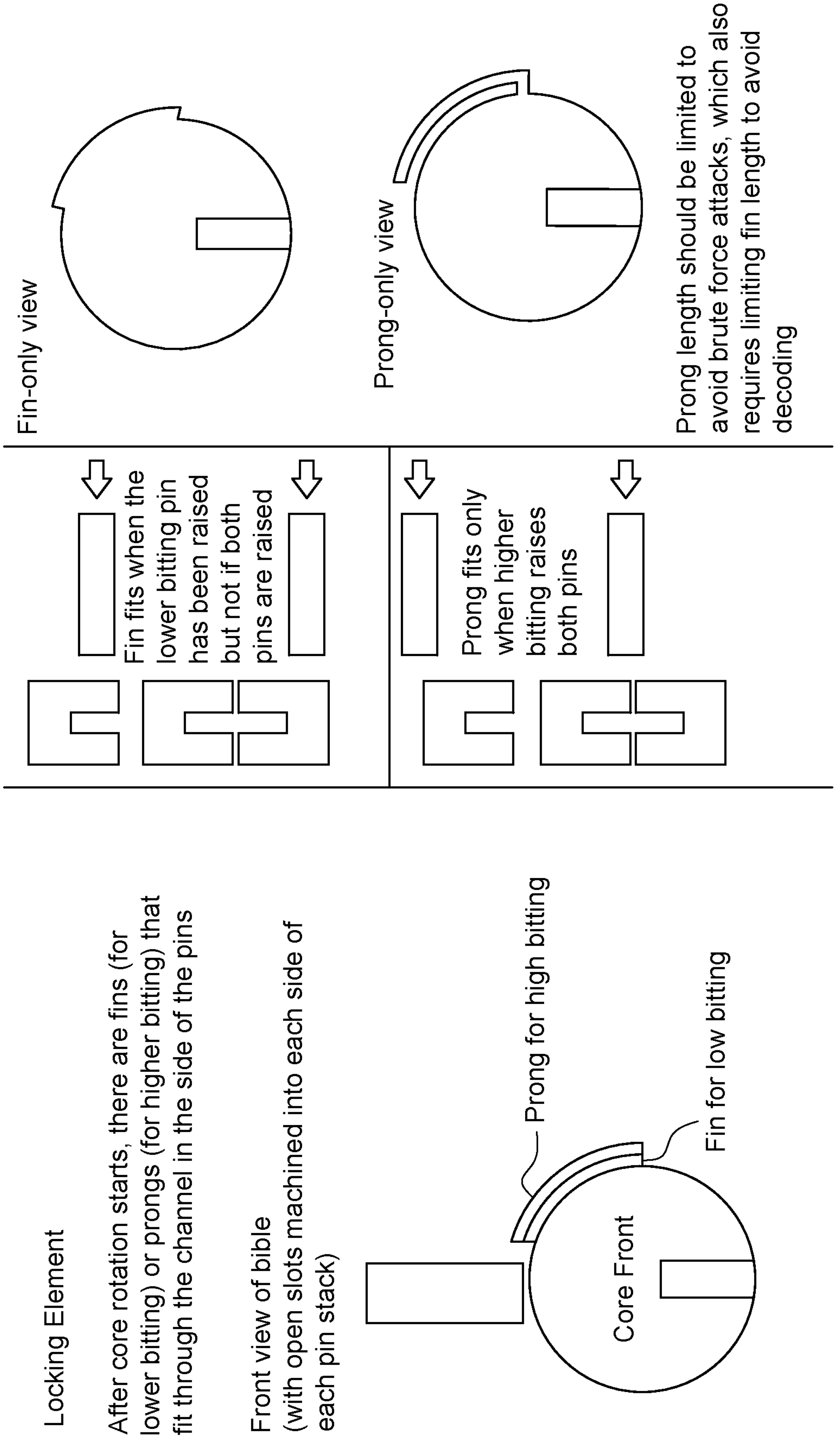
FIG. 7 illustrates another illustration of an embodiment.

FIGS. 6 and 7 provide illustrations for embodiments. The locks and keys can be made as proscribed by embodiments herein, but for example, one may choose to make the core (moveable frame) and housing (fixed frame) out of solid blocks of metal and drill out the channels for the teeth and the keyway (assuming the embodiment is a version with a key). The teeth can be cut from a long thin piece of metal (like a rod) and then machined to have any irregular surfaces necessary. Products can be produced by methods as proscribed by embodiments herein. There can be methods of using, as proscribed by embodiments herein. If one wishes, the method of using can track relatively closely to the apparatus embodiments in the claims set forth below or other embodiments disclosed herein.

Other embodiments can be implemented by an electronic input system, using levers, pads, and/or buttons in place of the mechanical locking system described above. Thus, instead of a key positioning/orienting teeth, a combination system or electrical system can used for that role.

Yet additional embodiments can be implemented by having the key applied to the exterior of the lock rather than inserted. That is, such an embodiment has the openings faced outwards for the key to be pressed against them rather than inwards for the key to affect them from an internal keyway.

In sum, it is important to recognize that this disclosure has been written as a thorough teaching rather than as a narrow dictate or disclaimer. Reference throughout this specification to "one embodiment", "an embodiment", or "a specific embodiment" means that a particular feature, structure, or characteristic described in connection with the embodiment is included in at least one embodiment and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other embodiments. It is to be understood that other variations and modifications of the embodiments described and illustrated herein are possible in light of the teachings herein and are to be considered as part of the spirit and scope of the present subject matter.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. Variation from amounts specified in this teaching can be "about" or "substantially," so as to accommodate tolerance for such as acceptable manufacturing tolerances.

The foregoing description of illustrated embodiments, including what is described in the Abstract and the Modes, and all disclosure and the implicated industrial applicability, are not intended to be exhaustive or to limit the subject matter to the precise forms disclosed herein. While specific embodiments of, and examples for, the subject matter are described herein for teaching-by-illustration purposes only, various equivalent modifications are possible within the spirit and scope of the present subject matter, as those skilled in the relevant art will recognize and appreciate. As indicated, these modifications may be made in light of the foregoing description of illustrated embodiments and are to be included, again, within the true spirit and scope of the subject matter disclosed herein.

The invention claimed is:

1. An apparatus including:
a key; and
a lock including:
  a fixed frame having a space;
  a movable frame having a range of motion within the said space and at least one opening, shaped such that said key may be applied to each said opening;
  at least one tooth adjacent each said opening; and
  a mechanism that regulates the motion by determining an orientation and/or position of each said tooth, the mechanism comprising, for each said tooth:
    an avenue in the fixed frame;
    for each said avenue in the fixed frame:
      an avenue in the movable frame,
        said avenues being disoriented except when aligned to form a combined avenue,
        the tooth in the avenue in the fixed frame and extendible into the combined avenue during a locked condition,
      a pushing mechanism that
        disposes the tooth to a position at an end of the combined avenue adjacent to the opening that is adjacent to the tooth and that disposes the tooth located in the avenue of the fixed frame to a position at an end of the avenue when the avenue and the other avenue are not aligned,
      an actuator having an other range of motion which corresponds to the range of motion of the moveable frame, and
      a mechanical resistor,
      wherein
      the key is configured to act through the opening to the combined avenue to displace the tooth from the combined avenue into the avenue of the fixed frame, or to shift the orientation of the tooth within the avenue of the fixed frame, or both, and the motion of the moveable frame causes avenue within the movable frame and the avenue in the fixed frame to no longer form the combined avenue thereby blocking the tooth from access via the avenue of the movable frame and the openings for the key and, after the access has been blocked, the tooth is compared to the mechanical resistor to allow the moveable frame to carry out the motion until the actuator progresses fully through the actuator's range of motion, and
      otherwise the tooth is separated from the avenue in the movable frame and from the openings for the key, and only then interfaces with the mechanical resistor to arrest the motion of the moveable frame and prevent from opening the lock, such that the tooth does not seize the lock.

2. The apparatus of claim 1, wherein the key comprises a key with protrusions and/or depressions, and the moveable frame further includes a keyway with said at least one opening to any said avenue of the moveable frame, and the key positions or orients any respective said tooth through said at least one opening.

3. The apparatus of claim 2, wherein the fixed frame and moveable frame are shaped so as to retain the moveable frame within the space of the fixed frame.

4. The apparatus of claim 3, further including:
a pin or ball bearing, positioned in each said avenue of the moveable frame, shaped to aid the key, when inserted into the keyway, in influencing a position and/or orientation of each said tooth.

5. The apparatus of claim 4, wherein the mechanical resistor comprises at least one protrusion,
said at least one tooth contains at least one channel configured to allow a corresponding said protrusion of the mechanical resistor to pass, and
the key, when inserted in the keyway, causes said at least one channel to align with the corresponding said protrusion the mechanical resistor such that the protrusion the mechanical resistor is able to pass, and such that if the at least one tooth is otherwise positioned, the protrusion of the mechanical resistor is not able to pass through the channel and said motion is arrested.

6. The apparatus of claim 4, wherein:
the mechanical resistor comprises grooves on a portion of the moveable frame facing the fixed frame and failing to arrest the motion when each said tooth is oriented as would be caused by the key when inserted in the keyway, but which arrests the motion when said at least one tooth is oriented otherwise.

7. The apparatus of claim 4, wherein:
said at least one tooth is at least two so as to have teeth,
the mechanical resistor comprises grooves in a portion of the moveable frame facing the fixed frame, oriented such that the teeth are in each avenue,
some, but not all, of the teeth each have a protrusion which becomes ensnared in a corresponding one of said grooves and arrests the motion, and
the key, when inserted in the keyway, places each said tooth that lacks the protrusion adjacent to a corresponding one of said grooves.

8. The apparatus of claim 2, further including a retaining clip, and wherein the moveable frame is shaped so as to allow attachment of the retaining clip, and in which the fixed frame, moveable frame, and the retaining clip are shaped such that the retaining clip retains the moveable frame within the fixed frame.

9. The apparatus of claim 8, further including:
a pin or ball bearing, positioned in each said avenue of the moveable frame, shaped to aid the key, when inserted into the keyway, in influencing a position and/or orientation of each said tooth.

10. The apparatus of claim 9, wherein the mechanical resistor comprises at least one protrusion, said at least one tooth contains at least one channel configured to allow a corresponding said protrusion of the mechanical resistor to pass, and the key, when inserted in the keyway, causes said at least one channel to align with the corresponding said protrusion the mechanical resistor such that the protrusion the mechanical resistor is able to pass, and such that if the at least one tooth is otherwise positioned, the protrusion of the mechanical resistor is not able to pass through the channel and said motion is arrested.

11. The apparatus of claim 9, wherein:

the mechanical resistor comprises grooves on a portion of the moveable frame facing the fixed frame and failing to arrest the motion when each said tooth is oriented to an openable position, but which arrests the motion when said at least one tooth is oriented otherwise.

12. The apparatus of claim 9, wherein:

said at least one tooth is at least two so as to have teeth, the mechanical resistor comprises grooves in a portion of the moveable frame facing the fixed frame, oriented such that the teeth are in each avenue, some, but not all, of the teeth each have a protrusion which becomes ensnared in a corresponding one of said grooves and arrests the motion, and the key, when acting through the said opening, places each said tooth that lacks the protrusion adjacent to a corresponding one of said grooves.

13. The apparatus of claim 2, further including:

a pin or ball bearing, positioned in each said avenue of the moveable frame, shaped to aid the key, when inserted into the keyway, in influencing a position and/or orientation of each said tooth.

14. The apparatus of claim 1, wherein the fixed frame and moveable frame are shaped so as to retain the moveable frame within the space of the fixed frame.

15. The apparatus of claim 1, further including a retaining clip, and wherein the moveable frame is shaped so as to allow attachment of the retaining clip, and in which the fixed frame, moveable frame, and the retaining clip are shaped such that the retaining clip retains the moveable frame within the fixed frame.

16. The apparatus of claim 1, wherein the mechanical resistor comprises at least one protrusion, said at least one tooth contains at least one channel configured to allow a corresponding said protrusion of the mechanical resistor to pass, and the apparatus, when operated so as to position and/or orient the at least one tooth to an openable position, causes said at least one channel to align with the protrusion of the mechanical resistor such that the protrusion of the mechanical resistor is able to pass, and such that if at least one said tooth is otherwise positioned, the protrusion of the mechanical resistor is not able to pass through the channel and said motion is arrested.

17. The apparatus of claim 1, wherein:

the mechanical resistor comprises grooves on a portion of the moveable frame facing the fixed frame and failing to arrest the motion when said at least one tooth is oriented to an openable position, but which arrests the motion when said at least one tooth is oriented otherwise.

18. The apparatus of claim 1, wherein:

said at least one tooth is at least two so as to have teeth, the mechanical resistor comprises grooves in a portion of the moveable frame facing the fixed frame, oriented such that the teeth are in each avenue, some, but not all, of the teeth each have a protrusion which becomes ensnared in a corresponding one of said grooves and arrests the motion, and the key, when acting through the said opening, places each said tooth that lacks the protrusion adjacent to a corresponding one of said grooves.

19. A process of making an apparatus, the process including:

assembling a lock that locks and opens with a key, the lock including:

a fixed frame having a space;

a movable frame having a range of motion within the said space and at least one opening, shaped such that said key may be applied to each said opening;

at least one tooth adjacent each said opening; and a mechanism that regulates the motion by determining an orientation and/or position of each said tooth, the mechanism comprising, for each said tooth:

an avenue in the fixed frame;

for each said avenue in the fixed frame:

an avenue in the movable frame, said avenues being disoriented except when aligned to form a combined avenue, the tooth in the avenue in the fixed frame and extendible into the combined avenue during a locked condition, a pushing mechanism that disposes the tooth to a position at an end of the combined avenue adjacent to the opening that is adjacent to the tooth and that disposes the tooth located in the avenue of the fixed frame to a position at an end of the avenue when the avenue and the other avenue are not aligned, an actuator having an other range of motion which corresponds to the range of motion of the moveable frame, and a mechanical resistor, wherein the key is configured to act through the opening to the combined avenue to displace the tooth from the combined avenue into the avenue of the fixed frame, or to shift the orientation of the tooth within the avenue of the fixed frame, or both, and the motion of the moveable frame causes the avenue within the movable frame and the avenue in the fixed frame to no longer form the combined avenue thereby blocking the tooth from access via the avenue of the movable frame and the openings for the key and, after the access has been blocked, the tooth is compared to the mechanical resistor to allow the moveable frame to carry out the motion until the actuator progresses fully through the actuator's range of motion, and otherwise the tooth is separated from the avenue in the movable frame and from the openings for the key, and only then interfaces with the mechanical resistor to arrest the motion of the moveable frame and prevent from opening the lock, such that the tooth does not seize the lock.

20. A process of using an apparatus, the process including:

installing a lock that locks and opens with a key, the lock including:

a fixed frame having a space;

a movable frame having a range of motion within the said space and at least one opening, shaped such that said key may be applied to each said opening;

at least one tooth adjacent each said opening; and a mechanism that regulates the motion by determining an orientation and/or position of each said tooth, the mechanism comprising, for each said tooth:

an avenue in the fixed frame;

for each said avenue in the fixed frame:

an avenue in the movable frame, said avenues being disoriented except when aligned to form a combined avenue, the tooth in the avenue in the fixed frame and extendible into the combined avenue during a locked condition, a pushing mechanism that disposes the tooth to a position at an end of the combined avenue adjacent to the opening that is adjacent to the tooth and that disposes the tooth located in the avenue of the fixed frame to a position at an end of the avenue when the avenue and the other avenue are not aligned, an actuator having an other range of motion which corresponds to the range of motion of the moveable frame, and a mechanical resistor, wherein the key is configured to act through the opening to the combined avenue to displace the tooth from the combined avenue into the avenue of the fixed frame, or to shift the orientation of the tooth within the avenue of the fixed frame, or both, and the motion of the moveable frame causes the avenue within the movable frame and the avenue in the fixed frame to no longer form the combined avenue thereby blocking the tooth from access via the avenue of the movable frame and the openings for the key and, after the access has been blocked, the tooth is compared to the mechanical resistor to allow the moveable frame to carry out the motion until the actuator progresses fully through the actuator's range of motion, and otherwise the tooth interfaces with the mechanical resistor to arrest the motion of the moveable frame and prevent from opening the lock, such that the tooth does not seize the lock.

* * * * *